Patented June 10, 1941

UNITED STATES PATENT OFFICE 2,245,129

PROCESS FOR PREPARING LINEAR POLYAMIDES

Crawford H. Greenewalt, Wilmington, Del., assignor to E. I. du Pont de Nemours & Company, Wilmington, Del., a corporation of Delaware No Drawing. Application September 29, 1938, Serial No. 232,471

9 Claims. (Cl. 260—2)

This invention relates to polymeric materials and more particularly to linear polyamides.

This invention has as an object a new method for the preparation of linear polyamides. A further object is a process for preparing linear polyamides which can be utilized in the manufacture of valuable synthetic fibers. Other objects will appear hereinafter.

The present invention is particularly directed to a new method for making the fiber-forming polyamides described in Patents 2,071,250 and 2,130,948.

These objects are accomplished by the process more fully described below, which comprises heating under pressure in the presence of water a polyamide-forming composition comprising essentially material in which the molecules provide two and only two complementary nitrile and amino groups. Thus the polyamide-forming composition may comprise substantially chemically equivalent quantities of a bifunctional nitrile of the general formula NC—R—CN and a diamine of the formula HR'N—R''—NR'H in which R' is hydrogen or a univalent organic radical, the connecting atom of said univalent organic radical being a carbon atom, and R and R'' are divalent organic radicals, the terminal atoms of said divalent organic radicals being carbon atoms. Or the polyamide-forming composition may consist of a bifunctional aminonitrile of formula

NC—R'''—NR'H wherein R''' is a divalent organic radical, the terminal atoms of said divalent organic radical being carbon atoms, from which the polyamide is formed likewise by interaction of the nitrile and amino group of one molecule with the complementary groups on another molecule to form a long-chain or linear polyamide.

My process comprises as a first step heating the polyamide-forming composition providing the bifunctional molecules carrying the amino and nitrile groups as above mentioned, with an excess of water in a closed reaction vessel under condensation polymerization conditions until a low molecular weight polyamide is formed. This step is accomplished by heating the reactants under polyamide-forming conditions, i. e. at temperatures of about 150°–300° C. The second step is carried out when, as in the preferred embodiment of this invention, a fiber-forming polyamide is to be obtained. This is accomplished by continuing the polymerization of the low molecular weight polyamide in the manner indicated below until the polymer exhibits satisfactory fiber-forming properties.

In the case of fiber-forming polyamides the reactants should be selected such that R of the dinitrile formula and R'' of the diamine formula has a chain length of at least three atoms and 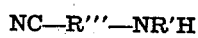 R''' of the aminonitrile formula has a chain length of at least five atoms. The fiber-forming polyamides are also prepared with less difficulty when R' in the above formula is so constituted that the carbon atom attached to the amino group is aliphatic. When fiber-forming polyamides are desired from diamines and dinitriles, substantially chemically equivalent amounts, e. g. not more than five molar per cent excess of either reactant, should be used.

In its preferred embodiment, the polymerization comprising the first step of the reaction is continued until a test sample of the reaction mixture, after removal of the ammonia and excess water, shows by incipient fiber-forming properties that the reaction has proceeded approximately as far as it is feasible to carry it at this stage. In general the time and temperature of reaction necessary to obtain polymers of the desired properties, the optimum molecular ratio of water to the nitrile group or groups of the reactants, and the necessity or desirability of employing a water-miscible diluent, e. g. phenol, to accomplish the desired polymerization are determined to a large extent by the nature of the reactants, the melting point of the resultant polymer, the quantities of the bifunctional reactants employed, and by the solubility of the polymer in water at reaction temperatures, respectively. Polyamides which form homogeneous solutions with water at a reaction temperature of 200°–250° C. in general yield high molecular weight products after removal of the ammonia and water. Polyamides which do not form homogeneous solutions with water at a reaction temperature of 200°–250° C. are best prepared in the presence of some water-miscible solvent, preferably phenol, which gives a homogeneous solution at the above-mentioned reaction temperature.

The second step of my process consists in the removal from the reaction mixture of the liberated ammonia and excess water at atmospheric or reduced pressures with simultaneous and/or subsequent heating of the polymer under condensation polymerization conditions. In its preferred embodiment, the second step is carried out at a temperature above the melting point of the polyamide and is continued until the polymer exhibits fiber-forming properties. However, it is not always necessary to carry out the second step of my process at temperatures above the melting point of the polyamide, particularly if the polyamide melts at a relatively high temperature, i. e. above 250° C. Although the necessary conditions for the preparation of fiber-forming polymers vary according to the particular case, in practice the conversion to a fiber-forming polymer is easily determined by touching the surface of the molten polymer with a rod and withdrawing the rod. If the fiber-forming stage has been reached, a continuous filament of considerable strength and pliability is readily obtained. The degree of polymerization may also be followed by determining the intrinsic viscosity of a solution of the polymer in m-cresol as described in Patent 2,130,948. Polyamides whose solutions have an intrinsic viscosity of not less than 0.4 are generally of sufficiently high molecular weight to yield continuous filaments.

The following examples, in which the quantities are stated in parts by weight, illustrate in greater detail the processes of this invention.

Example I

ε-Aminocaproic acid polymer.—A mixture of 11.2 parts of ε-aminocapronitrile (B. P. 132° C./30 mm.) and 10.8 parts of water was heated in an evacuated, closed reaction vessel at 220°–225° during 20 hours. After cooling, the vessel was opened, the ammonia expelled, and the excess water distilled. The resultant product was then heated under nitrogen at 255° C. during 3 hours. The ε-aminocaproic acid polymer was obtained as an opaque, colorless solid which melted to a thick, viscous liquid at about 195°–200° C., had an intrinsic viscosity of 0.48, and yielded continuous filaments of fair strength when the molten mass was touched with a rod and the rod withdrawn. By continuing the heat treatment at 255° C. under reduced pressure for several hours, a polymer was obtained which showed excellent fiber-forming aptitude.

Example II

Polyhexamethylene adipamide.—A mixture of 5.405 parts of hexamethylenediamine, 5.805 parts of adiponitrile and 10.8 parts of water was heated in a closed reaction vessel at 210°–215° C. during 20 hours. After cooling, the reactants were heated at 255° C. during one hour under nitrogen at atmospheric pressure, ammonia and water distilling during this period. The temperature of the reaction mixture was then increased to 287° C. and maintained at this point for two hours, during which time the low molecular weight polymer was converted into a high molecular weight product which formed a viscous, clear, colorless melt and which showed excellent fiber-forming properties.

The polyamide obtained in accordance with the foregoing example, was a tough, hard, opaque solid which melted at about 260° C. and had an intrinsic viscosity of 1.15. Continuous, pliable filaments of excellent strength were obtained by touching the molten polymer with a rod and withdrawing the rod. As far as could be determined by physical comparisons, the polymer was identical with a sample of polyhexamethylene adipamide prepared from hexamethylenediamine and adipic acid.

Example III

Polyhexamethylene sebacamide.—A mixture of 3.87 parts of hexamethylenediamine, 5.47 parts of sebaconitrile, 6 parts of phenol and 7.2 parts of water was heated in a closed reaction vessel during 22 hours at 215°–225° C. After cooling, the heat treatment was continued at 255° C. during two hours under nitrogen at atmospheric pressure, and finally at 255° C. for two hours at 20 mm., during which time the polymer was freed from phenol. The polymer melted at about 210° C., had an intrinsic viscosity of 0.56, and by touching the clear, colorless, viscous melt with a rod and withdrawing the rod continuous filaments of good strength were readily obtained.

Example IV 10-aminocapric acid polymer.—A mixture of 10.1 parts of 10-aminocaprinitrile (B. P. 170°–172° C./20 mm.), 8 parts of phenol and 6.5 parts of water was sealed in a closed reaction vessel and heated at 215°–225° C. during 32 hours. After cooling, the heat treatment was continued at 255° C. during one hour under nitrogen at atmospheric pressure and then at 255° C. for four hours at 20 mm., the polymer being freed from phenol during this final heating period. The polymer of 10-aminocapric acid was an opaque, colorless solid which melted to a clear, viscous liquid at about 170° C., had an intrinsic viscosity of 0.59, and was readily converted into continuous filaments as described in the above examples.

Example V

Polydecamethylene adipamide.—A mixture of 8.610 parts of decamethylenediamine, 5.405 parts of adiponitrile, and 10.8 parts of water in a closed reaction vessel was heated at 220°–225° C. during 11 hours. After cooling, the heat treatment was continued at 255° C. under nitrogen at atmospheric pressure during four hours. Polydecamethylene adipamide was obtained as an opaque, colorless solid which melted at about 230° C., had an intrinsic viscosity of 0.78, and could be converted into continuous filaments as described in the above examples.

Example VI

Polydecamethylene sebacamide.—A mixture of 6.888 parts of decamethylenediamine, 6.464 parts of sebaconitrile, 8 parts of phenol, and 8.6 parts of water was sealed in a closed reaction vessel and heated at 210°–220° C. during 29 hours. After cooling, the heat treatment was continued at 255° C. under nitrogen at atmospheric pressure during two hours and then at 255° C. for two hours at 20 mm. The polymer thus obtained melted at about 190° C. and had an intrinsic viscosity of 0.84. Continuous filaments of excellent strength were obtained by touching the molten mass with a rod and withdrawing the rod.

The preparation of polyamides is not limited to the use of the dinitriles and diamines and/or amino nitriles mentioned in the foregoing examples. Diamines containing primary amino groups react most readily, but diamines containing one or two secondary amino groups are also operative. Likewise, aminonitriles in which the amino group contains at least one replaceable hydrogen atom are operative. Additional examples of diamines which may be used are the following:

H$_2$N(CH$_2$)$_4$—NH$_2$
H$_2$N—(CH$_2$)$_2$—CHCH$_3$—(CH$_2$)$_3$—NH$_2$
H$_2$N—(CH$_2$)$_2$—O—(CH$_2$)$_2$—O—(CH$_2$)$_2$—NH$_2$
H$_3$CHN—(CH$_2$)$_6$—NHCH$_3$

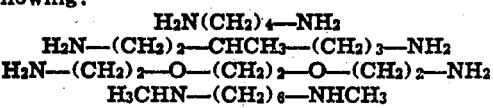

H$_2$N—CH$_2$—C$_6$H$_4$—CH$_2$NH$_2$
H$_2$N—C$_6$H$_4$—NH$_2$
H$_2$N—CH$_2$—C$_6$H$_4$—NH$_2$
H$_2$N—CHCH$_3$—(CH$_2$)$_6$—CHCH$_3$—NH$_2$
and H$_2$N—(CH$_2$)$_3$—S—(CH$_2$)$_3$—NH$_2$ As additional examples of dinitriles which may be used might be mentioned:

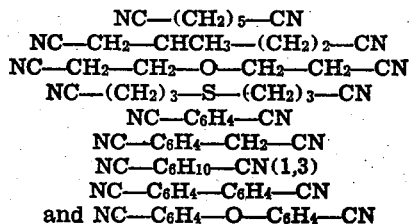

As additional examples of aminonitriles might be mentioned:

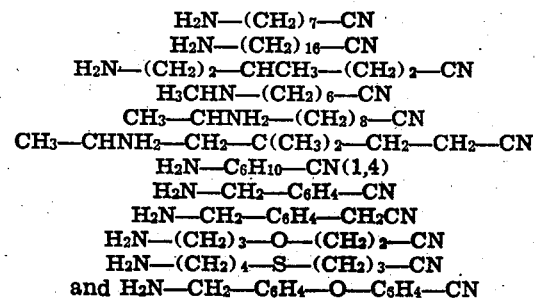

As will be apparent from the foregoing examples, the divalent and univalent radicals previously defined are free from reactive groups, which would interfere with linear polyamide formation which requires interaction between the terminal amide-forming groups.

In the preparation of polyamides of this invention, the reactants may be heated during the first step to a suitable reaction temperature, generally 150°–300° C., and preferably at 200°–250° C., in a closed vessel in the presence or absence of a diluent which may or may not be a solvent for the polymer. If a fiber-forming polymer is desired, the conditions of the reaction should be such that the by-product of the reaction, e. g. ammonia, and the excess water can escape.

To inhibit discoloration of the polyamide materials the second or final polymerization step of this process is preferably carried out in the absence of oxygen. This can be accomplished by operating in the presence of an inert gas such as nitrogen or carbon dioxide or by operating under reduced pressure.

If a solvent is used in the reaction, the polyamide may be freed of solvent by distillation at atmospheric or reduced pressures, depending on the nature of the solvent. The polymer, after the polymerization during the second step has reached the desired stage, may also be precipitated by the addition of a solvent in which the polymer is insoluble under ordinary conditions, such as ethyl acetate, acetone, alcohol, or dilute alkali. Final traces of a phenolic solvent may be removed from the precipitated polymer by extraction with hot alcohol, acetone or ethyl acetate, or by heating the polymer under reduced pressure at a temperature slightly above the melting point of the polymer. In addition to phenol, another phenolic solvent which is miscible with the reactants at the reaction temperature mentioned above is m-cresol. Other water-miscible solvents which may be used to increase the solubility of the polyamides in water at the reaction temperature are methanol, ethanol, n-propanol, isopropanol, and dioxan.

It is also within the scope of this invention to remove the ammonia from the reaction mixture as fast as it is liberated, and as soon as the liberation of ammonia has ceased the excess water can be removed and the condensation polymerization continued until the desired degree of polymerization has been reached. This can be accomplished by gradually releasing any excess pressure above the pressure of saturated water vapor at a given temperature, e. g. by maintaining a pressure substantially not less than 405.7 lbs./sq. in. and substantially not in excess of 410 lbs./sq.in. at a reaction temperature of 230° C. By gradually releasing any pressure in excess of the pressure of saturated water vapor at a given temperature, the ammonia is completely removed with very little loss of water.

Viscosity stabilized polymers, i. e. polymers capable of remaining substantially unchanged in viscosity (molecular weight) under continued conditions of heating as in melt-spinning, film-pressing, or compounding can be prepared by using as viscosity stabilizing agent a small amount of a mono- or bifunctional amide-forming agent. If the polymer-forming reactants comprise a diamine and a dinitrile, the addition of a small amount of one reactant in excess of the chemically equivalent amount will produce viscosity stabilized polymers. Viscosity stabilized polymers may also be prepared by adding as viscosity stabilizing agent a small amount of a different diamine or dinitrile. If fiber-forming products are desired, not more than five molar per cent of the viscosity stabilizing agent should be used.

Continuous filaments of the polyamides obtained according to the process of this invention may be obtained in a number of ways. The polymer may be dissolved in a suitable solvent and the solution extruded through orifices into a coagulating bath, the resulting filaments being continuously collected on a suitable revolving bobbin. The extruded filaments may also be passed through a heated chamber where the solvent is removed by evaporation. The filaments may also be prepared by extruding the molten polymer through orifices and collecting the resulting filaments on a suitable revolving bobbin. The diameter of the filaments may be regulated by controlling the temperature of the molten mass, the pressure used to extrude the polymer, the rate of reeling, the size of the orifice and the intrinsic viscosity of the polymer.

This process, however, is not limited to the manufacture of the fiber-forming polymers and it is within the scope of this invention to discontinue heating before that stage is reached. The low molecular weight or non-fiber-forming polymers are useful for certain applications, as for instance, in coating, molding, sizing, impregnating, and adhesive compositions, and the like.

Concerning the mechanism of the reaction involved in the present process, the preparation of nitrogen-substituted amides by the reaction of amines and nitriles in the presence of water can be formulated as taking place by three different courses, as follows: (1) The nitrile group may be hydrolyzed to the amide group, the amide group may be further hydrolyzed to the free carboxyl group and ammonia and, as amines are stronger bases than ammonia, an equilibrium,

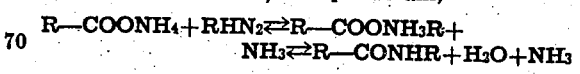

is presumably established in which the equilibrium constant would be expected to be large, indicating a high concentration of nitrogen substituted amide and ammonia. (2) The nitrogen-substituted amide may likewise result from the equilibrium,

the equilibrium constant for the reaction likewise being expected to be large, due to the difference in basicity of the two competing bases.
(3) The amide may also be formed by the addition of the amine to the nitrile group (the water serving as a catalyst for the addition) to give an amidine,

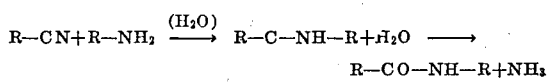

which in the presence of water is immediately hydrolyzed to the nitrogen-substituted amide and ammonia. There is no evidence to indicate definitely the method by which an amide is formed when an amine is reacted with a nitrile in the presence of water. It is believed that a nitrogen-substituted amide may be formed by any or all of these methods.

The fiber-forming polyamides obtained by the present process are useful for the various purposes given in the previously mentioned patents, the most valuable uses being the production of strong, highly oriented fibers which are suitable to be used as artificial silk, artificial hair, bristles, threads, filaments, yarn, ribbon, films, and the like.

The polyamides prepared according to this invention may be used in combination with other polymers, resins, plasticizers, pigments, dyes, etc.

This invention provides a process for the preparation of linear polyamides by the reaction of a dinitrile and a diamine. Commercially important fiber-forming polyamides of the type obtained from diamines and dibasic acids may therefore be prepared directly from the diamines and nitriles, which process offers a shorter route to polyamides of this type since dibasic acids are generally prepared from the corresponding dinitriles. This invention also provides a process for the polymerization of linear polyamides from polymerizable aminonitriles. Polyamides of the type obtainable from the difficultly available polymerizable amino acids may therefore be prepared from the readily available aminonitriles which are prepared by the partial hydrogenation of dinitriles.

As many apparently widely different embodiments of this invention may be made without departing from the spirit and scope thereof, it is to be understood that I do not limit myself to the specific embodiments thereof except as defined in the appended claims.

I claim:

1. A process for obtaining linear polyamides which comprises heating under pressure in the presence of water a polyamide-forming composition comprising essentially reacting material in which each molecule has two and only two reactive groups consisting of amide-forming groups separated by a divalent organic radical having terminal carbon atoms, each of said amide-forming groups in each molecule being complementary to one of the groups in every other molecule, and the number of chain atoms between complementary amide-forming groups being at least five, said groups being nitrile groups and amino groups.

2. A process for obtaining polyamides which comprises heating under pressure in the presence of water substantially chemically equivalent quantities of a dinitrile of the formula NC—R—CN and a diamine of the formula HR'N—R''NR'H in which R and R'' are divalent organic radicals having a chain length of at least 3 atoms, the terminal atoms of said divalent organic radicals being carbon atoms, and R' is a substituent of the class consisting of hydrogen and a univalent organic radical, the connecting atom of said univalent organic radical being carbon, and all of said organic radicals being free from reactive groups.

3. A process which comprises heating under pressure in the presence of water substantially chemically equivalent quantities of a dinitrile of the formula NC—R—CN and a diamine of the formula HR'N—R''NR'H in which R and R'' are divalent hydrocarbon radicals having a chain length of at least 3 atoms and R' is a substituent of the class consisting of hydrogen and a univalent hydrocarbon radical, heating the polyamide thus formed under conditions permitting escape of by-product of reaction, and continuing said last mentioned heating until the polyamide obtained is capable of being formed into fibers exhibiting upon X-ray examination orientation along the fiber axis.

4. A process for obtaining linear polyamides which comprises heating under pressure in the presence of water an aminonitrile of the formula NC—R'''—NR'H in which R''' is a divalent organic radical having terminal carbon atoms and having a chain length of at least 5 atoms, the terminal atoms of said divalent organic radical being carbon atoms, and in which R' is a substituent of the class consisting of hydrogen and a univalent organic radical, the connecting atom of said univalent organic radical being carbon, and all of said organic radicals being free from reactive groups.

5. A process for obtaining linear polyamides which comprises heating under pressure in the presence of water an aminonitrile of the formula NC—R'''—NR'H in which R''' is a divalent hydrocarbon radical having a chain length of at least 5 atoms and in which R' is a substituent of the class consisting of hydrogen and a univalent hydrocarbon radical, heating the polyamide thus formed under conditions permitting escape of by-product of reaction, and continuing said last mentioned heating until the polyamide obtained is capable of being formed into fibers exhibiting upon X-ray examination orientation along the fiber axis.

6. The process set forth in claim 3 in which R and R'' are divalent aliphatic hydrocarbon radicals and R' is hydrogen.

7. The process set forth in claim 5 in which R''' is a divalent aliphatic hydrocarbon radical and R' is hydrogen.

8. A process for obtaining linear polyamides which comprises heating under pressure adiponitrile and hexamethylene diamine in the presence of water.

9. A process for obtaining linear polyamides which comprises heating epsilon-aminocapronitrile under pressure in the presence of water, heating the polyamide thus formed under conditions permitting escape of by-product of reaction, and continuing said last mentioned heating until the polyamide obtained is capable of being formed into fibers exhibiting upon X-ray examination orientation along the fiber axis.

CRAWFORD H. GREENEWALT.